US012024975B2

(12) United States Patent
Liu et al.

(10) Patent No.: US 12,024,975 B2
(45) Date of Patent: Jul. 2, 2024

(54) SELF-GROWING DISPERSED PARTICLE GEL ACTIVE MOBILITY CONTROL SYSTEM AND FLUID CHANNELING CONTROL METHOD FOR LOW-PERMEABILITY-TIGHT RESERVOIR

(71) Applicants: China University of Petroleum (East China), Qingdao (CN); China University of Geosciences (Beijing), Beijing (CN)

(72) Inventors: Yifei Liu, Qingdao (CN); Caili Dai, Qingdao (CN); Guang Zhao, Qingdao (CN); Chenwei Zou, Qingdao (CN); Ning Yang, Qingdao (CN); Qing You, Beijing (CN); Mingwei Zhao, Qingdao (CN); Yining Wu, Qingdao (CN); Lin Li, Qingdao (CN); Yongpeng Sun, Qingdao (CN)

(73) Assignees: China University of Petroleum (East China), Qingdao (CN); China University of Geosciences (Beijing), Beijing (CN)

( * ) Notice: Subject to any disclaimer, the term of this patent is extended or adjusted under 35 U.S.C. 154(b) by 0 days.

(21) Appl. No.: 18/297,419

(22) Filed: Apr. 7, 2023

(65) Prior Publication Data
US 2023/0323750 A1 Oct. 12, 2023

(30) Foreign Application Priority Data
Apr. 8, 2022 (CN) .......................... 202210369541.6

(51) Int. Cl.
*E21B 33/13* (2006.01)
*C09K 8/508* (2006.01)
(Continued)

(52) U.S. Cl.
CPC ............ *E21B 33/13* (2013.01); *C09K 8/5086* (2013.01); *C09K 8/512* (2013.01); *C09K 8/584* (2013.01)

(58) Field of Classification Search
CPC .......... E21B 33/13; C09K 8/512; C09K 8/584
(Continued)

(56) References Cited

U.S. PATENT DOCUMENTS

| 4,532,052 A | * | 7/1985 | Weaver ................... C09K 8/508 |
| | | | 507/923 |
| 8,387,695 B1 | * | 3/2013 | Shanbhag ............... C04B 26/10 |
| | | | 166/295 |

(Continued)

FOREIGN PATENT DOCUMENTS

| CA | 2924465 | 5/2015 |
| CA | 2924465 A1 | 5/2015 |

(Continued)

OTHER PUBLICATIONS

Office action and Search Report from Chinese Application No. 202210369541.6 dated Mar. 2, 2023.
(Continued)

*Primary Examiner* — William D Hutton, Jr.
*Assistant Examiner* — Ashish K Varma
(74) *Attorney, Agent, or Firm* — Calfee, Halter & Griswold LLP

(57) ABSTRACT

The invention relates to the field of oilfield development engineering, and discloses a self-growing gel dispersion active fluidity control system and a fluid channeling control method for a low-permeability-tight reservoir. The system contains 100 parts by weight of a self-growing gel dispersion and 0.15-0.6 part by weight of a surfactant, the self-growing gel dispersion is prepared by shearing and grinding nano-reinforced chromium-aldehyde double-group cross-
(Continued)

linked integral gel, and the preparation method of the nano-reinforced chromium-aldehyde double-group cross-linked integral gel comprises the following steps: adding a functional polymer, a phenolic resin cross-linking agent, are organic chromium cross-linking agent and a nano-reinforcer into water, mixing, and curing. The system can be simply and rapidly prepared, is easy for deep injection by adjusting the size of gel dispersion particles, is wide in action range, high in stability and long in effective period of action, can avoid reservoir pollution, and does not affect the liquid production capacity of the reservoir. The gel dispersion particles can achieve self-growth in the low-permeability-tight reservoir fractures, and the fracture fluid channeling control effect is enhanced.

3 Claims, 2 Drawing Sheets

(51) Int. Cl.
*C09K 8/512* (2006.01)
*C09K 8/584* (2006.01)
(58) Field of Classification Search
USPC .......................................................... 166/270
See application file for complete search history.

(56) References Cited

U.S. PATENT DOCUMENTS

| 2017/0369766 A1* | 12/2017 | Johnson | C09K 8/508 |
| 2018/0306014 A1* | 10/2018 | Nguyen | C09K 8/685 |
| 2021/0115317 A1* | 4/2021 | Jin | C09K 8/516 |

FOREIGN PATENT DOCUMENTS

| CN | 102936490 A | 2/2013 |
| CN | 103589414 A | 2/2014 |
| CN | 105504158 A | 4/2016 |
| CN | 106047324 A | 10/2016 |
| CN | 105504158 B | 4/2017 |
| CN | 106634908 A | 5/2017 |
| CN | 110079289 A | 8/2019 |
| CN | 110387222 A | 10/2019 |
| CN | 112409611 A | 2/2021 |
| WO | 2014/200889 A1 | 12/2014 |

OTHER PUBLICATIONS

Notice of Grant from Chinese Application No. 202210369541.6 dated Mar. 24, 2023.
Granted Claims from Chinese Application No. 202210369541.6 along with English translation attached.

\* cited by examiner

SELF-GROWING DISPERSED PARTICLE GEL ACTIVE MOBILITY CONTROL SYSTEM AND FLUID CHANNELING CONTROL METHOD FOR LOW-PERMEABILITY-TIGHT RESERVOIR

CROSS REFERENCE TO RELATED APPLICATIONS

The application claims the benefit of the Chinese patent application No. 202210369541.6, filed on Apr. 8, 2022, entitled "Self-growing Dispersed Particle Gel Active Mobility Control System and Fluid Channeling Control Method for Hypotonic reservoir", which is specifically and entirely incorporated herein by reference.

FIELD

The present disclosure relates to the field of oilfield development engineering, in particular to a self-growl g dispersed particle gel active mobility control system and a fluid channeling control method for low-permeability-tight reservoir.

BACKGROUND

Petroleum, so-called "an industrial blood", has an irreplaceable significance for the development of the national economy in China. Along with the social and economic development in China, the petroleum consumption demand has been continually increasing.

Due to the continuously deep-going exploitation of oil and gas resources and the sharp increase of the worldwide demand for petroleum resources, the development of unconventional oil and gas resources has received widespread attention, in particular, the oil and gas resources in the low-permeability-tight reservoir has emerged as the strategic resources with the most practical significance for replacing the existing oil and gas resources. Despite the exploitation of low-permeability-tight reservoir in China has achieved continuous progress, the production capacity remains small as compared with the existing oil and gas reservoir, and the recovery ratio is lower than 20%, the exploitation exhibits the obvious characteristics that the resource reserve mismatches the production, and the economic efficiency is low. The main reasons reside in that the natural fractures in the reservoir are developed, or the reservoir has obvious fluid channeling path after hydraulic fracturing, the fluid channeling is serious during the process of water injection, gas injection and energization, a large portion of energy is wasted, and the spread range is small, so that the secondary oil production technologies cannot be effectively implemented; on the other hand, a large amount of crude oil is accumulated at the nano-micro scale pores and fractures in the low-permeability-tight reservoir, the nano-micro scale pore throat causes the extremely high percolation resistance, such that the crude oil in the matrix cannot be efficiently displaced, the mobilization of crude oil is extremely difficult.

Therefore, in response to the current situations and challenges in the development of low-permeability-tight reservoirs, two key problems shall be urgently solved for increasing the recovery efficiency of oil and gas from the low-permeability-tight reservoirs. The first problem involves with how to improve the heterogeneity between the matrix and fractures with different scales, and control the fluid channeling in large-scale fractures, increase the sweep range of micro-scale fractures and the matrix. The second problem is associated with how to increase the imbibition and oil displacement efficiency in the matrix and micro-fractures by means of an influence of chemicals on the interface.

In order to improve heterogeneity of the low-permeability-tight reservoir matrix-fracture network dual media system, increase the spread range of the oil displacement fluid and reservoir energy, and achieve the equilibrium displacement of the matrix-fracture network dual media system, the researchers have mainly proposed and investigated four types of mobility control methods as follows:

(1) Water Alternating Gas (WAG)

The water alternating gas injection is one of the most commonly used mobility control methods in gas injection development oilfields. By separately injecting water slugs and gas slugs into the reservoir to create the water phase interface and gas phase interface, the formed phase interface creates a barrier in the fractures that reduces relative permeability, and forces the subsequent injection media to migrate into the micro-fractures or matrix, thereby fulfilling the purposes of reducing fluidity ratio, expanding the spread range and enhancing the oil recovery. However, the water alternating gas injection has obvious problem concerning the significant difficulties in the subsequent rounds of injection (water plugging effect), which is particularly acute in the development process of low permeability-tight reservoir; in addition, the injection of extraneous water may increase the mixed-phase difficulty between the injected gas and the geodetic hydrocarbons, and reduce the gas absorption capability of the stratum.

(2) Foam

Foam is a widely applied method for controlling fluidity and enhancing oil recovery. Foam is effective in regulating and controlling the large scale fractures through the Jamin Effect, thereby controlling fluidity of the subsequently injected medium, in order to fulfill the purposes of expanding the spread range and enhancing the oil recovery. In addition, the foam has selectivity for both the stratum permeability and the oil-water, and exhibits the properties that the foam blocks the large fractures and does not plug the micro-fractures, it blocks water without plugging the oil. However, the foam per se is an unstable system, although the stability of conventional foam is improved to some extent through the development of the polymer foam, gel foam, three-phase foam and the like, it still does not substantially solve the problem of poor stability and short useful life. Moreover, because of its obvious Jamin Effect during an injection process of foam, it has been difficult to inject the sufficient volume of foam, especially during the throughput (i.e., swallowing and spitting out the slugs) development process.

(3) Cross-Linked Polymer Gel

The polymer cross-linked gel-based mobility control method has been widely used and developed over the last few decades, it is the relatively successful mobility control method at present. The polymer gel mobility control method is applied in the low permeability fracture type oil reservoirs. The mechanism of plugging the fluid channeling is using a gelling liquid formed by dissolving the polymer and a crosslinking agent, the gelling liquid forms an integral gel having a plugging property in the target sites after injecting into the fractures or the fluid channeling path at a certain location, thereby plugging the fluid channeling path, and diverting the flow of the subsequently injected medium liquid for the purpose of expanding the spread range and enhancing the oil recovery. However, the plugging mode of gel is the "perfusing sausage" filling mode, which causes the fractures to be nearly completely blocked and the fractures have almost lost the diverting capability, which may impose a large influence on the subsequent liquid production capacity of the ultra-low-permeability, tight reservoir, or even cause problems of failing to produce liquid. In addition, the injected gelling liquid tends to contaminate the matrix to some extent if the gelling liquid is extruded into the matrix and the gel is formed.

(4) Soft Particles

Soft body particle-type regulating agent prepared on the ground is a new type of mobility control system developed in recent years. The most widely researched and used soft body particle mobility control agent in low permeability reservoirs is Polymer Microspheres (PMs). The polymer microspheres have been used in the mobility control on-site application in the Changing low permeability oilfields in China, and produce some effects. However, the polymer microspheres can only be used for mobility control in fractures by means of physical swelling and stacking, the mobility control capability is weak. The technical bottleneck of the poor mobility control of polymer microspheres is that the "physical-only stacking" regulation structure is unstable, the polymer microspheres can be easily scattered especially when the flow rate of fluid in fractures is high, both the force between the particles and rock walls and the force among the particles are weak, the mobility control capability cannot be further improved. In addition, the polymer microspheres are prepared with the emulsion polymer, the production process is complicated, and a fine control is required, which leads to unstable product quality and high costs.

Therefore, the existing mobility control methods have the defects such as injection difficulties in the process of injecting into the low-permeability-tight reservoir, poor stability, short useful life; the "perfusing sausage" filling mode seriously effects the diverting capability of fractures and liquid production capacity of the reservoir, or weak mobility control capability in the fractures, and limited improvement of the sweep range, the mobility control methods cannot meet the technical requirements of mobility control and enhancing oil recovery of the low-permeability-tight reservoir.

SUMMARY

In response to the above-described deficiencies of the existing methods, the present disclosure provides a self-growing dispersed particle gel active mobility control system and fluid channeling control method for low-permeability-tight reservoir to improve heterogeneity between low-permeability-tight reservoir matrix and fractures with different scales, control fluid channeling, increase sweep range of reservoir while enhancing the efficiency of crude oil mobilization within matrices and micro-fractures, thereby effectively increasing the recovery efficiency of the low-permeability-tight reservoir.

In order to achieve the above objects, a first aspect of the present disclosure provides a self-growing dispersed particle gel active mobility control system for low-permeability-tight reservoir, wherein the active mobility control system contains 100 parts by weight of a self-growing dispersed particle gel and 0.15-0.6 part by weight of a surfactant;

wherein the self-growing dispersed particle gel is prepared by shearing and grinding a nano-reinforced chromium-aldehyde double-group cross-linked integral gel;
the method of preparing the nano-reinforced chromium-aldehyde double-group cross-linked integral gel comprising: adding a functional polymer, a phenolic resin cross-linking agent, an organic chromium cross-linking agent and a nano-reinforcer into water, mixing, and curing.

Preferably, the surfactant is a compounded system of an alkylphenol polyoxyethylene ether type surfactant and a dialkylphenol sulfobetaine;

Preferably, a weight ratio of the alkylphenol polyoxyethylene ether type surfactant to the dialkylphenol sulfobetaine is (2-3):1.

Preferably, the functional polymer is used in an amount of 0.4-0.8 wt %, the phenolic resin cross-linking agent is used in an amount of 0.2-0.4 wt %, the organic chromium cross-linking agent is used in an amount of 0.07-0.1 wt %, the nano-reinforcing agent is used in an amount of 0.1-0.2 wt %, and the water is used in an amount of 98.5-99.23 wt %, based on the total weight of the functional polymer, the phenolic resin cross-linking agent, the nano-reinforcing agent and the water.

Preferably, the conditions of the curing include: a temperature within a range of 85-95° C. and a time of 1-3 h.

Preferably, the functional polymer is an acrylamide/vinylsulfonate/acrylamide methylpropanesulfonate terpolymer.

Preferably, the functional polymer has a relative molecular mass within a range of $6 \times 10^6$-$8 \times 10^6$.

Preferably, the phenolic resin cross-linking agent is a phenolic resin pre-polymer;

Preferably, the organic chromium cross-linking agent is chromium acetate;

Preferably, the nano-reinforcer is hydrophilic nanosilica;

Preferably, the hydrophilic nanosilica has a particle diameter within a range of 20-30 nm.

A second aspect of the present disclosure provides a method for controlling fluid channeling between an injection well and a producing well in low-permeability-tight reservoir, wherein the method comprising:

A1: injecting a preposition pre-treatment slug into the injection well, the injection amount is 0.1-1 vol. % of fluid channeling path between the injection well and the producing well;

A2: sequentially injecting a first stage main slug, a second stage main slug and a third stage main slug into the injection well, the injection amount of the first stage main slug is 15-20 vol. % of the fluid channeling path between the injection well and the producing well, the injection amount of the second stage main slug is 10-15 vol. % of the fluid channeling path between the injection well and the producing well, and the injection amount of the third stage main slug is 5-10 vol. % of the fluid channeling path between the injection well and the producing well;

A3: injecting a postposition protection slug into the injection well, the injection amount is 1-10 vol. % of the fluid channeling path between the injection well and the producing well;

A4: injecting a displacement slug into the injection well, the injection amount is 0.1-1 vol. % of the fluid channeling path between the injection well and the producing well;

A5: annealing well for 5-20 days;

A6: opening well, and performing displacement;

in step A1, the preposition pre-treatment slug is a pressure-reduction injection enhancer;

in step A2, the first stage main slug, the second stage main slug and the third stage main slug are a mobility control system comprising a self-growing dispersed particle gel and a surfactant, wherein the self-growing dispersed particle gel in the first stage main slug has a size of 500-1,000 nm, the self-growing dispersed particle gel in the second stage main slug has a size of 10-100 μm; and the self-growing dispersed particle gel in the third stage main slug has a size of 500-1,000 μm;

Preferably, the active mobility control system is the aforementioned self-growing dispersed particle gel active mobility control system for a low-permeability-tight reservoir.

Preferably, the pressure-reduction injection enhancer is an alkyl ammonium bromide surfactant solution or a hydrophobic nanosilica dispersion liquid;

Preferably, the postposition protection slug is the aforementioned nano-reinforced chromium-aldehyde double-group cross-linked integral gel;

Preferably, the displacement slug is water or a polyacrylamide solution.

A third aspect of the present disclosure provides a method for controlling a throughput fluid channeling of a producing well in low-permeability-tight reservoir, wherein the method comprising:

B1: swallowing a preposition pre-treatment slug into the producing well, stopping the operation when the wellhead pressure rises 0.5-1 MPa;

B2: swallowing a first stage main slug into the producing well, stopping the operation when the wellhead pressure rises 1-3 MPa, followed by swallowing a second stage main slug, stopping the operation when the wellhead pressure rises 1-3 MPa, then swallowing a third stage main slug, stopping the operation when the wellhead pressure rises 1-3 MPa;

B3: swallowing a displacement slug into the producing well, stopping the operation when the wellhead pressure rises 0.5-1 MPa;

B4: annealing well for 5-20 days;

B5: opening well, and spitting out;

in step B2, the first stage main slug, the second stage main slug and the third stage main slug are a mobility control system comprising a self-growing dispersed particle gel and a surfactant, wherein the gel in the first stage main slug has a size of 500-1,000 nm, the gel in the second stage main slug has a size of 10-100 μm; and the gel in the third stage main slug has a size of 500-1,000 μm;

Preferably, the active mobility control system is the self-growing dispersed particle gel active mobility control system for a low-permeability-tight reservoir.

Preferably, the preposition pre-treatment slug is a surfactant solution;

Preferably, the displacement slug is a foam system.

The advantages of the present disclosure compared to the methods in the prior art are as follows:

(1) The mobility control system of the present disclosure is an active mobility control system with self-growth functional characteristics, and the system can be simply and rapidly prepared, the system can avoid reservoir pollution without affecting liquid production capacity of the reservoir by adjusting the size of dispersed particle gel particles to achieve the objects that the system is easy for deep injection, is wide in action range, high in stability and long in effective period of action. In addition, the dispersed particle gel particles can achieve self-growth in the fractures of low-permeability-tight reservoir, and the fracture fluid channeling control effect is enhanced; the surfactant can achieve an efficient displacement of crude oil in the low-permeability-tight reservoir matrix, thereby improving the oil production capacity of the matrix.

(2) The mobility control system of the present disclosure has the dual effects of controlling fluidity of fluid in fractures and enhancing the displacement efficiency of crude oil in matrix, thereby expanding the spread range of reservoir and displacement efficiency of crude oil, and effectively improving the recovery ratio of low-permeability-tight reservoir.

(3) The mobility control system of the present disclosure has simple application method, and can be used directly after the rapid preparation of liquid on site, thus the application efficiency is increased.

(4) The fluid channeling control method of the present disclosure achieves synergy of a plurality of functional slugs by combining the plurality of functional slugs, thereby enhancing the effect of improving oil recovery of the self-growing dispersed particle gel on active fluid property control system to the utmost extent.

DETAILED DESCRIPTION

Figure 1:
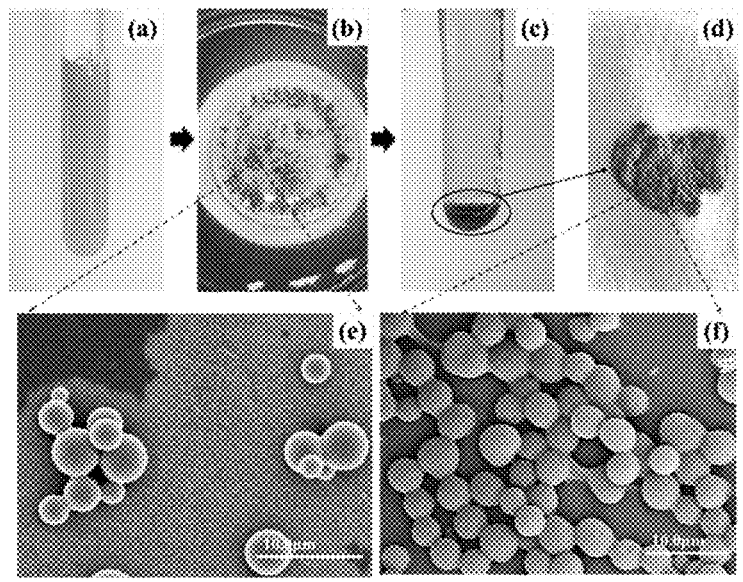
FIG. 1 illustrates a set of photographs showing the morphology features and self-growth characteristics of the self-growing dispersed particle gel active fluid control system described in Example 1 after different days of curing.

The specific embodiments of the present disclosure will be described below in detail with reference to figures. It shall be understood that the specific embodiments described herein merely serve to illustrate and explain the present disclosure, instead of limiting thereto.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

A first aspect of the present disclosure provides a self-growing dispersed particle gel active mobility control system for a low-permeability-tight reservoir, wherein the active mobility control system contains 100 parts by weight of a self-growing dispersed particle gel and 0.15-0.6 part by weight of a surfactant;

wherein the self-growing dispersed particle gel is prepared by shearing and grinding a nano-reinforced chromium-aldehyde double-group cross-linked integral gel;

the method of preparing the nano-reinforced chromium-aldehyde double-group cross-linked integral gel comprising: adding a functional polymer, a phenolic resin cross-linking agent, an organic chromium cross-linking agent and a nano-reinforcer into water, mixing, and curing.

In the present disclosure, the mobility control system has a self-growth functional characteristic, shearing and grinding the nano-reinforced chromium-aldehyde double-group cross-linked integral gel with a colloid grinder to obtain dispersed particle gel particles, then diluting the dispersed particle gel particles in water into a suspension of the dispersed particle gel particles, then adding a surfactant, and mixing uniformly, the mixture is ready for use. During the use process, the dispersed particle gel particles prepared with the nano-reinforced chromium-aldehyde double-group cross-linked integral gel can play a role of controlling the fluidity of fluids after self-growth in low-permeability-tight reservoir fractures, and the surfactant can serve to perform the oil displacement and/or the osmotic adsorption and oil extraction functions in low-permeability-tight reservoir.

In a preferred embodiment, the specific steps of preparing a suspension of dispersed particle gel particles with the nano-reinforced chromium-aldehyde double-group cross-linked integral gel are as follows: adding nano-reinforced chromium-aldehyde double-group cross-linked integral gel into a colloid grinder, arranging a rotational speed of shearing to be within a range of 1,000-10,000 rpm, and performing a cyclic shearing for 1-15 minutes, to prepare a mother liquor of dispersed particle gel particles having a mean particle diameter within a range of 500 nm-3.5 mm, then adding water to diluting the mother liquor by a dilution factor of 10-50, thus obtaining the suspension of dispersed particle gel particles.

In specific embodiments, the nano-reinforced chromium-aldehyde double-group cross-linked integral gel may be used for preparing a suspension of dispersed particle gel particles with different sizes, e.g., nanoscale, microscale and millimeter.

During the practical use process, the self-growing dispersed particle gel in the mobility control system and a surfactant component may be used directly after mixing, or may be used at different time periods during the fluid channeling control process.

In the present disclosure, the surfactant is preferably a surfactant system with oil displacement and/or osmotic adsorption functions for the specific reservoir conditions. In a preferred embodiment, the surfactant is a compounded system of an alkylphenol polyoxyethylene ether type surfactant and a dialkylphenol sulfobetaine.

It is further preferred that a weight ratio of the alkylphenol polyoxyethylene ether type surfactant to the dialkylphenol sulfobetaine is (2-3): 1.

In a preferred embodiment, the functional polymer is used in an amount of 0.4-0.8 wt %, the phenolic resin cross-linking agent is used in an amount of 0.2-0.4 wt %, the organic chromium cross-linking agent is used in an amount of 0.07-0.1 wt %, the nano-reinforcing agent is used in an amount of 0.1-0.2 wt %, and the water is used in an amount of 98.5-99.23 wt %, based on the total weight of the functional polymer, the phenolic resin cross-linking agent, the nano-reinforcing agent and the water.

In preferred embodiments, the conditions of the curing include: a temperature within a range of 85-95° C. and a time of 1-3 h. In particular, the temperature of the curing may be 85° C., 86° C., 87° C., 88° C., 89° C., 90° C., 91° C., 92° C., 93° C., 94° C. or 95° C., and the time of the curing may be 1 h, 1.5 h, 2 h, 2.5 h or 3 h.

In preferred embodiments, the functional polymer is an acrylamide/vinylsulfonate/acrylamide methylpropane-sulfonate terpolymer, the functional polymer is beneficial for improving stability of the integral gel and the dispersed particle gel particles.

Further preferably, the functional polymer has a relative molecular mass within a range of $6 \times 10^6$-$8 \times 10^6$.

In a preferred embodiment, the phenolic resin cross-linking agent is a phenolic resin pre-polymer, wherein the phenolic hydroxyl groups of the phenolic resin cross-linking agent molecules impart the self-growth functional characteristics to the integral gel and the dispersed particle gel particles.

In a preferred embodiment, the organic chromium cross-linking agent is chromium acetate; the organic chromium cross-linking agent can shorten the cross-linking reaction time of the integral gel, and achieve a rapid jelly formation of the integral gel, and improve the production efficiency.

In a preferred embodiment, the nano-reinnforcer is hydrophilic nanosilica; the nano-reinnforcer is conducive to enhancing strength of the integral gel and the dispersed particle gel particles.

Further preferably, the hydrophilic nanosilica has a particle diameter within a range of 20-30 nm.

A second aspect of the present disclosure provides a method for controlling fluid channeling between an injection well and a producing well in low-permeability-tight reservoir, wherein the method comprising:

A1: injecting a preposition pre-treatment slug into the injection well, the injection amount is 0.1-1 vol % of fluid channeling path between the injection well and the producing well;

A2: sequentially injecting a first stage main slug, a second stage main slug and a third stage main slug into the injection well, the injection amount of the first stage main slug is 15-20 vol % of the fluid channeling path between the injection well and the producing well, the injection amount of the second stage main slug is 10-15 vol % of the fluid channeling path between the injection well and the producing well, and the injection amount of the third stage main slug is 5-10 vol % of the fluid channeling path between the injection well and the producing well;

A3: injecting a postposition protection slug into the injection well, the injection amount is 1-10 vol % of the fluid channeling path between the injection well and the producing well;

A4: injecting a displacement slug into the injection well, the injection amount is 0.1-1 vol % of the fluid channeling path between the injection well and the producing well;

A5: annealing well for 5-20 days;

A6: opening well, and performing displacement;

in step A1, the preposition pre-treatment slug is a pressure-reduction injection enhancer;

in step A2, the first stage main slug, the second stage main slug and the third stage main slug are a mobility control system comprising a self-growing dispersed particle gel and a surfactant, wherein the self-growing dispersed particle gel in the first stage main slug has a size of 500-1,000 nm, the self-growing dispersed particle gel in the second stage main slug has a size of 10-100 μm; and the self-growing dispersed particle gel in the third stage main slug has a size of 500-1,000 μm.

In the method for controlling of fluid channeling between a injection well and a producing well after fracturing of low-permeability-tight reservoir according to the present disclosure, a mobility control system is injected into the reservoir fractures from a water injection well, the annealing well is performed such that the dispersed particle gel particles in the mobility control system self-grow under the reservoir conditions, the self-grown dispersed particle gel can effectively control fluidity of the subsequently injected fluid (water or gas), thereby increasing the reservoir spread volume of the subsequently injected fluid; a surfactant in the mobility control system can efficiently perform the osmotic adsorption and/or oil displacement for the crude oil in the reservoir matrix during the annealing well and subsequent production process, thereby improving the osmotic adsorption, extraction and displacement efficiency of crude oil.

In a preferred embodiment, the mobility control system is the aforementioned self-growing dispersed particle gel active mobility control system for a low-permeability-tight reservoir.

In a preferred embodiment, the pressure-reduction injection enhancer is an alkyl ammonium bromide surfactant solution or a hydrophobic nanosilica dispersion liquid, it performs the functions of pretreatment, pressure reduction and augmenting injection. In a specific embodiment, the concentration of the alkyl ammonium bromide surfactant solution is 0.2-0.5 wt %; and the concentration of the hydrophobic nanosilica dispersion liquid is 0.1-0.2 wt %.

In a preferred embodiment, the postposition protection slug is the aforementioned nano-reinforced chromium-aldehyde double-group cross-linked integral gel, which can enhance the mobility control effect of the active self-growing mobility control system.

In a preferred embodiment, the displacement slug is water or a polyacrylamide solution, which serves to displace the first stage main slug and postposition protection slugs deep into the reservoir.

A third aspect of the present disclosure provides a method for controlling a throughput fluid channeling of a producing well in low-permeability-tight reservoir, wherein the method comprising:
- B1: swallowing a preposition pre-treatment slug into the producing well, stopping the operation when the wellhead pressure rises 0.5-1 MPa;
- B2: swallowing a first stage main slug into the producing well, stopping the operation when the wellhead pressure rises 1-3 MPa, followed by swallowing a second stage main slug, stopping the operation when the wellhead pressure rises 1-3 MPa, then swallowing a third stage main slug, stopping the operation when the wellhead pressure rises 1-3 MPa;
- B3: swallowing a displacement slug into the producing well, stopping the operation when the wellhead pressure rises 0.5-1 MPa;
- B4: annealing well for 5-20 days;
- B5: opening well, and spitting out;
- in step B2, the first stage main slug, the second stage main slug and the third stage main slug are a mobility control system comprising a self-growing dispersed particle gel and a surfactant, wherein the self-growing dispersed particle gel in the first stage main slug has a size of 500-1,000 nm, the self-growing dispersed particle gel in the second stage main slug has a size of 10-100 μm; and the self-growing dispersed particle gel in the third stage main slug has a size of 500-1,000 μm.

In a preferred embodiment, the mobility control system is the aforementioned self-growing dispersed particle gel active mobility control system for a low-permeability-tight reservoir.

In the present disclosure, the preposition pre-treatment slug is a surfactant solution. Preferably, the surfactant is the same surfactant as that used in step B2, and performs the oil displacement and/or the osmotic adsorption and oil extraction functions during the annealing well and spitting out process.

In a preferred embodiment, the displacement slug is a foam system, which serves to displace the first stage main slug and preposition pre-treatment slugs deep into the reservoir, and enhance the mobility control effect of the active self-growing mobility control system, and the foam can perform the oil displacement and/or the osmotic adsorption and oil extraction functions after a defoaming process.

In the method for controlling a throughput fluid channeling of a producing well in low-permeability-tight reservoir after fracturing, a mobility control system is swallowed into the reservoir fractures from a producing well, annealing well is then implemented such that the dispersed particle gel particles in the mobility control system self-grow under the reservoir conditions, the self-grown dispersed particle gel can effectively control fluidity of the fluid (water or gas or oil) during the spitting out process, slow the attenuation rate of reservoir energy, reduce the fluid channeling waste of the reservoir energy, thereby increasing the mobilization volume of the reservoir energy during the spitting out process; in addition, a surfactant in the mobility control system achieves the efficient osmotic adsorption and/or displacement for the crude oil in the reservoir matrix during the annealing well and subsequent production process, thereby increasing the mobilization efficiency of the crude oil.

The present disclosure will be described below in detail with reference to examples, but the protection scope of the present disclosure is not limited thereto.

Example 1

Active mobility control system S1: the a active mobility control system S1 contains 100 parts by weight of self-growing dispersed particle gel and 0.35 parts by weight of a surfactant;

Wherein the self-growing dispersed particle gel was prepared by shearing and grinding a nano-reinforced chromium-aldehyde double-group cross-linked integral gel with a colloid grinder. A method of preparing the nano-reinforced chromium-aldehyde double-group cross-linked integral gel comprising: acrylamide/vinylsulfonate/acrylamide methylpropanesulfonate terpolymer (with a relative molecular mass of $5\times10^6$), phenolic resin pre-polymer, chromium acetate and hydrophilic nanosilica (with a particle diameter of 20-30 nm) were added into water and mixed uniformly, and then subjected to curing at 90° C. for 2 h; the acrylamide/vinylsulfonate/acrylamide methylpropanesulfonate terpolymer was used in an amount of 0.6 wt %, the phenolic resin pre-polymer was used in an amount of 0.3 wt %, the chromium acetate was used in an amount of 0.09 wt %, the hydrophilic nanosilica was used in an amount of 0.15 wt %, and water was used in an amount of 98.86 wt %, based on the total weight of the acrylamide/vinylsulfonate/acrylamide methylpropanesulfonate terpolymer, the phenolic resin pre-polymer, the chromium acetate, the hydrophilic nanosilica and water.

The surfactant was a compounded system of an alkylphenol polyoxyethylene ether type surfactant and a dialkylphenol sulfobetaine in a weight ratio of 2:1.

Example 2

Active mobility control system S2: contains 100 parts by weight of self-growing dispersed particle gel and 0.35 parts by weight of a surfactant;

Wherein the self-growing dispersed particle gel was prepared by shearing and grinding a nano-reinforced chromium-aldehyde double-group cross-linked integral gel with a colloid grinder. A method of preparing the nano-reinforced chromium-aldehyde double-group cross-linked integral gel comprising: acrylamide/vinylsulfonate/acrylamide methylpropanesulfonate terpolymer (with a relative molecular mass of $5 \times 10^6$), phenolic resin pre-polymer, chromium acetate and hydrophilic nanosilica (with a particle diameter of 20-30 nm) were added into water and mixed uniformly, and then subjected to curing at 90° C. for 2 h; the acrylamide/vinylsulfonate/acrylamide methylpropanesulfonate terpolymer was used in an amount of 0.5 wt %, the phenolic resin pre-polymer was used in an amount of 0.25 wt %, the chromium acetate was used in an amount of 0.1 wt %, the hydrophilic nanosilica was used in an amount of 0.17 wt %, and water was used in an amount of 98.98 wt %, based on the total weight of the acrylamide/vinylsulfonate/acrylamide methylpropanesulfonate terpolymer, the phenolic resin pre-polymer, the chromium acetate, the hydrophilic nanosilica and water.

The surfactant was a compounded system of an alkylphenol polyoxyethylene ether type surfactant and a dialkylphenol sulfobetaine in a weight ratio of 3:1.

Example 3

Active mobility control system S3: contains 100 parts by weight of self-growing dispersed particle gel and 0.5 parts by weight of a surfactant;

Wherein a method of preparing the nano-reinforced chromium-aldehyde double-group cross-linked integral gel comprising: acrylamide/vinylsulfonate/acrylamide methylpropanesulfonate terpolymer (with a relative molecular mass of $5 \times 10^6$), phenolic resin pre-polymer, chromium acetate and hydrophilic nanosilica (with a particle diameter of 20-30 nm) were added into water and mixed uniformly, and then subjected to curing at 90° C. for 2 h; the acrylamide/vinylsulfonate/acrylamide methylpropanesulfonate terpolymer was used in an amount of 0.6 wt %, the phenolic resin pre-polymer was used in an amount of 0.3 wt %, the chromium acetate was used in an amount of 0.09 wt %, the hydrophilic nanosilica was used in an amount of 0.15 wt %, and water was used in an amount of 98.86 wt %, based on the total weight of the acrylamide/vinylsulfonate/acrylamide methylpropanesulfonate terpolymer, the phenolic resin pre-polymer, the chromium acetate, the hydrophilic nanosilica and water.

The surfactant was a compounded system of an alkylphenol polyoxyethylene ether type surfactant and a dialkylphenol sulfobetaine in a weight ratio of 2:1.

Example 4

Active mobility control system S4: contains 100 parts by weight of self-growing dispersed particle gel and 0.4 parts by weight of a surfactant;

Wherein a method of preparing the nano-reinforced chromium-aldehyde double-group cross-linked integral gel comprising: acrylamide/vinylsulfonate/acrylamide methylpropanesulfonate terpolymer (with a relative molecular mass of $5 \times 10^6$), phenolic resin pre-polymer, chromium acetate and hydrophilic nanosilica (with a particle diameter of 20-30 nm) were added into water and mixed uniformly, and then subjected to curing at 90° C. for 2 h; the acrylamide/vinylsulfonate/acrylamide methylpropanesulfonate terpolymer was used in an amount of 0.72 wt %, the phenolic resin pre-polymer was used in an amount of 0.34 wt %, the chromium acetate was used in an amount of 0.08 wt %, the hydrophilic nanosilica was used in an amount of 0.13 wt %, and water was used in an amount of 98.73 wt %, based on the total weight of the acrylamide/vinylsulfonate/acrylamide methylpropanesulfonate terpolymer, the phenolic resin pre-polymer, the chromium acetate, the hydrophilic nanosilica and water.

The surfactant was a compounded system of an alkylphenol polyoxyethylene ether type surfactant and a dialkylphenol sulfobetaine in a weight ratio of 2:1.

Example 5

Active mobility control system S5: contains 100 parts by weight of self-growing dispersed particle gel and 0.15 parts by weight of a surfactant;

Wherein a method of preparing the nano-reinforced chromium-aldehyde double-group cross-linked integral gel comprising: acrylamide/vinylsulfonate/acrylamide methylpropanesulfonate terpolymer (with a relative molecular mass of $5 \times 10^6$), phenolic resin pre-polymer, chromium acetate and hydrophilic nanosilica (with a particle diameter of 20-30 nm) were added into water and mixed uniformly, and then subjected to curing at 90° C. for 2 h; the acrylamide/vinylsulfonate/acrylamide methylpropanesulfonate terpolymer was used in an amount of 0.8 wt %, the phenolic resin pre-polymer was used in an amount of 0.22 wt %, the chromium acetate was used in an amount of 0.1 wt %, the hydrophilic nanosilica was used in an amount of 0.14 wt %, and water was used in an amount of 98.74 wt %, based on the total weight of the acrylamide/vinylsulfonate/acrylamide methylpropanesulfonate terpolymer, the phenolic resin pre-polymer, the chromium acetate, the hydrophilic nanosilica and water.

The surfactant was a compounded system of an alkylphenol polyoxyethylene ether type surfactant and a dialkylphenol sulfobetaine in a weight ratio of 2:1.

Example 6

Active mobility control system S6: contains 100 parts by weight of self-growing dispersed particle gel and 0.4 parts by weight of a surfactant;

Wherein a method of preparing the nano-reinforced chromium-aldehyde double-group cross-linked integral gel comprising: acrylamide/vinylsulfonate/acrylamide methylpropanesulfonate terpolymer (with a relative molecular mass of $5 \times 10^6$), phenolic resin pre-polymer, chromium acetate and hydrophilic nanosilica (with a particle diameter of 20-30 nm) were added into water and mixed uniformly, and then subjected to curing at 90° C. for 2 h; the acrylamide/vinylsulfonate/acrylamide methylpropanesulfonate terpolymer was used in an amount of 0.4 wt %, the phenolic resin pre-polymer was used in an amount of 0.36 wt %, the chromium acetate was used in an amount of 0.075 wt %, the hydrophilic nanosilica was used in an amount of 0.1 wt %, and water was used in an amount of 99.065 wt %, based on the total weight of the acrylamide/vinylsulfonate/acrylamide methylpropanesulfonate terpolymer, the phenolic resin pre-polymer, the chromium acetate, the hydrophilic nanosilica and water.

The surfactant was a compounded system of an alkylphenol polyoxyethylene ether type surfactant and a dialkylphenol sulfobetaine in a weight ratio of 3:1.

Comparative Example 1

Active mobility control system D1: the system D1 was implemented according to the same method described in Example 1, except that in the mobility control system, a surfactant was used in an amount of 0.1 parts by weight, based on 100 parts by weight of nano-reinforced chromium-aldehyde double-group cross-linked integral gel.

Comparative Example 2

Active mobility control system D2: contains 100 parts by weight of self-growing dispersed particle gel and 0.35 parts by weight of a surfactant;

Wherein a method of preparing the nano-reinforced chromium-aldehyde double-group cross-linked integral gel comprising: acrylamide/vinylsulfonate/acrylamide methylpropanesulfonate terpolymer (with a relative molecular mass of $5 \times 10^6$), phenolic resin pre-polymer, chromium acetate were added into water and mixed uniformly, and then subjected to curing at 90° C. for 2 h; the acrylamide/vinylsulfonate/acrylamide methylpropanesulfonate terpolymer was used in an amount of 0.6 wt %, the phenolic resin pre-polymer was used in an amount of 0.3 wt %, the chromium acetate was used in an amount of 0.09 wt %, and water was used in an amount of 99.01 wt %, based on the total weight of the acrylamide/vinylsulfonate/acrylamide methylpropanesulfonate terpolymer, the phenolic resin pre-polymer, the chromium acetate and water.

The surfactant was a compounded system of an alkylphenol polyoxyethylene ether type surfactant and a dialkylphenol sulfobetaine in a weight ratio of 2:1.

Comparative Example 3

Active mobility control system D3: contains 100 parts by weight of self-growing dispersed particle gel and 0.35 parts by weight of a surfactant;

Wherein a method of preparing the nano-reinforced chromium-aldehyde double-group cross-linked integral gel comprising: acrylamide/vinylsulfonate/acrylamide methylpropanesulfonate terpolymer (with a relative molecular mass of $5 \times 10^6$), phenolic resin pre-polymer, chromium acetate and hydrophilic nanosilica (with a particle diameter of 20-30 nm) were added into water and mixed uniformly, and then subjected to curing at 90° C. for 2 h; the acrylamide/vinylsulfonate/acrylamide methylpropanesulfonate terpolymer was used in an amount of 0.25 wt %, the phenolic resin pre-polymer was used in an amount of 0.3 wt %, the chromium acetate was used in an amount of 0.09 wt %, the hydrophilic nanosilica was used in an amount of 0.15 wt %, and water was used in an amount of 99.21 wt %, based on the total weight of the acrylamide/vinylsulfonate/acrylamide methylpropanesulfonate terpolymer, the phenolic resin pre-polymer, the chromium acetate, the hydrophilic nanosilica and water.

The surfactant was a compounded system of an alkylphenol polyoxyethylene ether type surfactant and a dialkylphenol sulfobetaine in a weight ratio of 2:1.

Comparative Example 4

Active mobility control system D4: contains 100 parts by weight of self-growing dispersed particle gel and 0.35 parts by weight of a surfactant;

Wherein a method of preparing the nano-reinforced chromium-aldehyde double-group cross-linked integral gel comprising: acrylamide/vinylsulfonate/acrylamide methylpropanesulfonate terpolymer (with a relative molecular mass of $5 \times 10^6$), phenolic resin pre-polymer, chromium acetate and hydrophilic nanosilica (with a particle diameter of 20-30 nm) were added into water and mixed uniformly, and then subjected to curing at 90° C. for 2 h; the acrylamide/vinylsulfonate/acrylamide methylpropanesulfonate terpolymer was used in an amount of 0.9 wt %, the phenolic resin pre-polymer was used in an amount of 0.3 wt %, the chromium acetate was used in an amount of 0.09 wt %, the hydrophilic nanosilica was used in an amount of 0.15 wt %, and water was used in an amount of 98.56 wt %, based on the total weight of the acrylamide/vinylsulfonate/acrylamide methylpropanesulfonate terpolymer, the phenolic resin pre-polymer, the chromium acetate, the hydrophilic nanosilica and water.

The surfactant was a compounded system of an alkylphenol polyoxyethylene ether type surfactant and a dialkylphenol sulfobetaine in a weight ratio of 2:1.

Comparative Example 5

Active mobility control system D5: contains 100 parts by weight of self-growing dispersed particle gel and 0.35 parts by weight of a surfactant;

Wherein a method of preparing the nano-reinforced chromium-aldehyde double-group cross-linked integral gel included the following steps: acrylamide/vinylsulfonate/acrylamide methylpropanesulfonate terpolymer (with a relative molecular mass of $5 \times 10^6$), phenolic resin pre-polymer, chromium acetate and hydrophilic nanosilica (with a particle diameter of 20-30 nm) were added into water and mixed uniformly, and then subjected to curing at 90° C. for 2 h; the acrylamide/vinylsulfonate/acrylamide methylpropanesulfonate terpolymer was used in an amount of 0.6 wt %, the phenolic resin pre-polymer was used in an amount of 0.15 wt %, the chromium acetate was used in an amount of 0.06 wt %, the hydrophilic nanosilica was used in an amount of 0.15 wt %, and water was used in an amount of 99.04 wt %, based on the total weight of the acrylamide/vinylsulfonate/acrylamide methylpropanesulfonate terpolymer, the phenolic resin pre-polymer, the chromium acetate, the hydrophilic nanosilica and water.

The surfactant was a compounded system of an alkylphenol polyoxyethylene ether type surfactant and a dialkylphenol sulfobetaine in a weight ratio of 2:1.

Example 7

A method for controlling fluid channeling between an injection well and a producing well in low-permeability-tight reservoir, wherein the method comprising:

A1: a preposition pre-treatment slug (alkyl ammonium bromide surfactant solution with a concentration of 0.3 wt %) was injected into the injection well, the injection amount was 0.5 vol % of the control reservoir pores and fractures of the injection well and producing well network;

A2: a first stage main slug (active mobility control system S1, wherein the gel was sheared in the colloid grinder to a size of 750 nm), a second stage main slug (active mobility control system S1, wherein the gel was sheared in the colloid grinder to a size of 17 μm), and a third stage main slug (active mobility control system S1, wherein the gel was sheared in the colloid grinder to a size of 560 μm) were injected sequentially into the injection well, the injection amount of the first stage main slug was 17.5 vol % of the control reservoir pores and fractures of the injection well and producing well network, the injection amount of the second stage main slug was 12.5 vol % of the control reservoir pores and fractures of the injection well and producing well network, and the injection amount of the third stage main slug was 7.5 vol % of the control reservoir pores and fractures of the injection well and producing well network;

A3: a postposition protection slug (the gel used in the active mobility control system S1) was injected into the injection well, the injection amount was 5 vol % of the control reservoir pores and fractures;

A4: a displacement slug (polyacrylamide solution) was injected into the injection well, the injection amount was 0.5 vol % of the control reservoir pores and fractures;

A5: the well was annealed for 15 days;

A6: the well was opened, and the displacement was performed.

Example 8

A method for controlling fluid channeling between an injection well and a producing well in low-permeability-tight reservoir, wherein the method comprising:

A1: a preposition pre-treatment slug (alkyl ammonium bromide surfactant solution with a concentration of 0.3 wt %) was injected into the injection well, the injection amount was 0.5 vol % of the control reservoir pores and fractures of the injection well and producing well network;

A2: a first stage main slug (active mobility control system S2, wherein the gel was sheared in the colloid grinder to a size of 960 nm), a second stage main slug (active mobility control system S2, wherein the gel was sheared in the colloid grinder to a size of 56 µm), and a third stage main slug (active mobility control system S2, wherein the gel was sheared in the colloid grinder to a size of 970 µm) were injected sequentially into the injection well, the injection amount of the first stage main slug was 17.5 vol % of the control reservoir pores and fractures of the injection well and producing well network, the injection amount of the second stage main slug was 12.5 vol % of the control reservoir pores and fractures of the injection well and producing well network, and the injection amount of the third stage main slug was 7.5 vol % of the control reservoir pores and fractures of the injection well and producing well network;

A3: a postposition protection slug (the gel used in the active mobility control system S2) was injected into the injection well, the injection amount was 5 vol % of the control reservoir pores and fractures;

A4: a displacement slug (an aqueous solution) was injected into the injection well, the injection amount was 0.5 vol % of the control reservoir pores and fractures;

A5: the well was annealed for 15 days;

A6: the well was opened, and the displacement was performed.

Example 9

A method for controlling fluid channeling between an injection well and a producing well in low-permeability-tight reservoir, wherein the method comprising:

A1: a preposition pre-treatment slug (a hydrophobic nano-silica dispersion liquid with a concentration of 0.15 wt %) was injected into the injection well, the injection amount was 0.2 vol % of the control reservoir pores and fractures of the injection well and producing well network;

A2: a first stage main slug (active mobility control system S1, wherein the gel was sheared in the colloid grinder to a size of 720 nm), a second stage main slug (active mobility control system S1, wherein the gel was sheared in the colloid grinder to a size of 690 µm), and a third stage main slug (active mobility control system S1, wherein the gel was sheared in the colloid grinder to a size of 810 µm) were injected sequentially into the injection well, the injection amount of the first stage main slug was 16 vol % of the control reservoir pores and fractures of the injection well and producing well network, the injection amount of the second stage main slug was 11 vol % of the control reservoir pores and fractures of the injection well and producing well network, and the injection amount of the third stage main slug was 8 vol % of the control reservoir pores and fractures of the injection well and producing well network;

A3: a postposition protection slug (the gel used in the active mobility control system S1) was injected into the injection well, the injection amount was 3 vol % of the control reservoir pores and fractures;

A4: a displacement slug (polyacrylamide solution) was injected into the injection well, the injection amount was 0.3 vol % of the control reservoir pores and fractures;

A5: the well was annealed for 10 days;

A6: the well was opened, and the displacement was performed.

Example 10

A method for controlling fluid channeling between an injection well and a producing well in low-permeability-tight reservoir, wherein the method comprising:

A1: a preposition pre-treatment slug (alkyl ammonium bromide surfactant solution with a concentration of 0.3 wt %) was injected into the injection well, the injection amount was 0.8 vol % of the control reservoir pores and fractures of the injection well and producing well network;

A2: a first stage main slug (active mobility control system S1, wherein the gel was sheared in the colloid grinder to a size of 620 nm), a second stage main slug (active mobility control system S1, wherein the gel was sheared in the colloid grinder to a size of 45 µm), and a third stage main slug (active mobility control system S1, wherein the gel was sheared in the colloid grinder to a size of 660 µm) were injected sequentially into the injection well; the injection amount of the first stage main slug was 20 vol % of the control reservoir pores and fractures of the injection well and producing well network, the injection amount of the second stage main slug was 15 vol % of the control reservoir pores and fractures of the injection well and producing well network, and the injection amount of the third stage main slug was 10 vol % of the control reservoir pores and fractures of the injection well and producing well network;

A3: a postposition protection slug (the gel used in the active mobility control system S1) was injected into the injection well, the injection amount was 10 vol % of the control reservoir pores and fractures;

A4: a displacement slug (polyacrylamide solution) was injected into the injection well, the injection amount was 1 vol % of the control reservoir pores and fractures;

A5: the well was annealed for 15 days;

A6: the well was opened, and the displacement was performed.

Comparative Example 6

The method was implemented according to the same method described in Example 7, except that the specific process of the step A2 was as follows: a body slug (active mobility control system S1, wherein the gel was sheared in the colloid grinder to a size of 16 μm) was injected into the injection well, the injection amount was 35 vol % of the control reservoir pores and fractures of the injection well and producing well network.

Comparative Example 7

The method was implemented according to the same method described in Example 7, except that the specific process of the step A2 was as follows: a first stage main slug (conventional mobility control agent polymer microspheres having a particle diameter of 800 nm), a second stage main slug (conventional mobility control agent polymer microspheres having a particle diameter of 12 μm), and a third stage main slug (conventional mobility control agent pre-crosslinked gel particles having a particle diameter of 650 μm) were injected sequentially into the injection well, the injection amount of the first stage main slug was 17.5 vol % of the control reservoir pores and fractures of the injection well and producing well network, the injection amount of the second stage main slug was 12.5 vol % of the control reservoir pores and fractures of the injection well and producing well network, and the injection amount of the third stage main slug was 7.5 vol % of the control reservoir pores and fractures of the injection well and producing well network.

Example 11

A method for controlling a throughput fluid channeling of producing well in low-permeability-tight reservoir, wherein the method comprising:
B1: a preposition pre-treatment slug (a surfactant used in the active mobility control system S1) was swallowed into the producing well, the operation was stopped when the wellhead pressure raised 0.8 MPa;
B2: a first stage main slug (active mobility control system S1, wherein the gel was sheared in the colloid grinder to a size of 660 nm) was swallowed into the producing well, the operation was stopped when the wellhead pressure raised 2 MPa; a second stage main slug (active mobility control system S1, wherein the gel was sheared in the colloid grinder to a size of 16 μm) was then swallowed, the operation was stopped when the wellhead pressure raised 2 MPa; a third stage main slug (active mobility control system S1, wherein the gel was sheared in the colloid grinder to a size of 590 μm) was subsequently swallowed, the operation was stopped when the wellhead pressure raised 2 MPa;
B3: a displacement slug (a foam system) was swallowed into the producing well, the operation was stopped when the wellhead pressure raised 0.8 MPa;
B4: the well was annealed for 15 days;
B5: the well was opened, and the spitting out was performed.

Example 12

A method for controlling a throughput fluid channeling of producing well in low-permeability-tight reservoir, wherein the method comprising:
B1: a preposition pre-treatment slug (a surfactant used in the active mobility control system S2) was swallowed into the producing well, the operation was stopped when the wellhead pressure raised 0.5 MPa;
B2: a first stage main slug (active mobility control system S2, wherein the gel was sheared in the colloid grinder to a size of 660 nm) was swallowed into the producing well, the operation was stopped when the wellhead pressure raised 1 MPa; a second stage main slug (active mobility control system S2, wherein the gel was sheared in the colloid grinder to a size of 16 μm) was then swallowed, the operation was stopped when the wellhead pressure raised 1 MPa; a third stage main slug (active mobility control system S2, wherein the gel was sheared in the colloid grinder to a size of 590 μm) was subsequently swallowed, the operation was stopped when the wellhead pressure raised 1 MPa;
B3: a displacement slug (a foam system) was swallowed into the producing well, the operation was stopped when the wellhead pressure raised 0.5 MPa;
B4: the well was annealed for 15 days;
B5: the well was opened, and the spitting out was performed.

Example 13

A method for controlling a throughput fluid channeling of producing well in low-permeability-tight reservoir, wherein the method comprising:
B1: a preposition pre-treatment slug (a surfactant used in the active mobility control system S1) was swallowed into the producing well, the operation was stopped when the wellhead pressure raised 1 MPa;
B2: a first stage main slug (active mobility control system S1, wherein the gel was sheared in the colloid grinder to a size of 660 nm) was swallowed into the producing well, the operation was stopped when the wellhead pressure raised 3 MPa; a second stage main slug (active mobility control system S1, wherein the gel was sheared in the colloid grinder to a size of 16 μm) was then swallowed, the operation was stopped when the wellhead pressure raised 3 MPa; a third stage main slug (active mobility control system S1, wherein the gel was sheared in the colloid grinder to a size of 590 μm) was subsequently swallowed, the operation was stopped when the wellhead pressure raised 3 MPa;
B3: a displacement slug (a foam system) was swallowed into the producing well, the operation was stopped when the wellhead pressure raised 1 MPa;
B4: the well was annealed for 15 days;
B5: the well was opened, and the spitting out was performed.

Example 14

A method for controlling a throughput fluid channeling of producing well in low-permeability-tight reservoir, wherein the method comprising:
B1: a preposition pre-treatment slug (a surfactant used in the active mobility control system S1) was swallowed into the producing well, the operation was stopped when the wellhead pressure raised 0.8 MPa;
B2: a first stage main slug (active mobility control system S1, wherein the gel was sheared in the colloid grinder to a size of 900 nm) was swallowed into the producing well, the operation was stopped when the wellhead pressure raised 2 MPa; a second stage main slug (active mobility control system S1, wherein the gel was sheared in the colloid grinder to a size of 88 µm) was then swallowed, the operation was stopped when the wellhead pressure raised 2 MPa; a third stage main slug (active mobility control system S1, wherein the gel was sheared in the colloid grinder to a size of 900 µm) was subsequently swallowed, the operation was stopped when the wellhead pressure raised 2 MPa;

B3: a displacement slug (a foam system) was swallowed into the producing well, the operation was stopped when the wellhead pressure raised 0.8 MPa;

B4: the well was annealed for 15 days;

B5: the well was opened, and the spitting out was performed.

Comparative Example 8

The method was implemented according to the same method described in Example 11, except that the specific process of the step B2 was as follows: a body slug (active mobility control system S1, wherein the gel was sheared in the colloid grinder to a size of 16 µm) was swallowed into the producing well, the operation was stopped when the wellhead pressure raised 6 MPa.

Comparative Example 9

The method was implemented according to the same method described in Example 11, except that the specific process of the step B2 was as follows: a first stage main slug (conventional mobility control agent polymer microspheres having a particle diameter of 700 nm) was swallowed into the producing well, the operation was stopped when the wellhead pressure raised 2 MPa; a second stage main slug (conventional mobility control agent polymer microspheres having a particle diameter of 15 µm) was then swallowed, the operation was stopped when the wellhead pressure raised 2 MPa; a third stage main slug (conventional mobility control agent pre-crosslinked gel particles having a particle diameter of 600 µm) was subsequently swallowed, the operation was stopped when the wellhead pressure raised 2 MPa.

Test Example 1

A set of photographs showing the morphology features and self-growth characteristics of the active mobility control system described in Example 1 after different days of curing were shot, the results were as shown in FIG. 1, wherein FIG. 1(*a*) illustrated the initial state, FIG. 1(*b*) illustrated the macro-morphology of the active mobility control system after curing for 7 days, FIG. 1(*c*) illustrated the macro-morphology of the active mobility control system after curing for 30 days, FIG. 1(*d*) illustrated the self-growing agglomerates formed by curing for 30 days, FIG. 1(*e*) illustrated the micro-morphology of the active mobility control system after curing for 7 days, and FIG. 1(*f*) illustrated the micro-morphology of the active mobility control system after curing for 30 days.

As shown by the FIG. 1, during the curing process, the dispersed particle gel particles in the active mobility control system still maintained the regularly spherical shape, and the particle diameter of an individual particle remained substantially unchanged without structural damage or destabilization. On the other hand, as the proceeding of the curing process, a plurality of particles gradually coalesced to form agglomerates, thereby effectively stabilizing and controlling the water fluid channeling fractures of the reservoir.

Test Example 2

The fracture controlling ability and oil-water interfacial activity of the active mobility control systems in Examples 1-6 and Comparative Examples 1-5 were tested by using the rock core displacement plugging ratio measurement experiment and the oil-water interfacial tension measurement experiment. The rock core displacement plugging ratio measurement experiment method was as follows: the experimental facility was placed at a constant temperature of 90° C., the simulated water was injected into a fractured cylindrical and dense core containing fractures (the core with a length of 10 cm and a diameter of 2.5 cm) at a displacement rate of 0.1 mL/min, a stable injection pressure P1 was obtained; an active mobility control system was injected into the core at a displacement rate of 0.1 mL/min, an injection amount was 2 mL; the core was subjected to standing still and curing for 3 days; the simulated water was again injected into the rock core at a displacement rate of 0.1 mL/min, a stable injection pressure P2 was obtained; the plugging ratio $R=(P2-P1)/P2$ was calculated. The oil-water interfacial tension measurement experiment was as follows: about 0.5 µL of crude oil was injected into a standard silica tube equipped with an active mobility control system, and the oil-water interfacial tension value was measured by using a TX500C rotary-droplet ultra-low interfacial tension meter at the temperature of 90° C.

Figure 2:
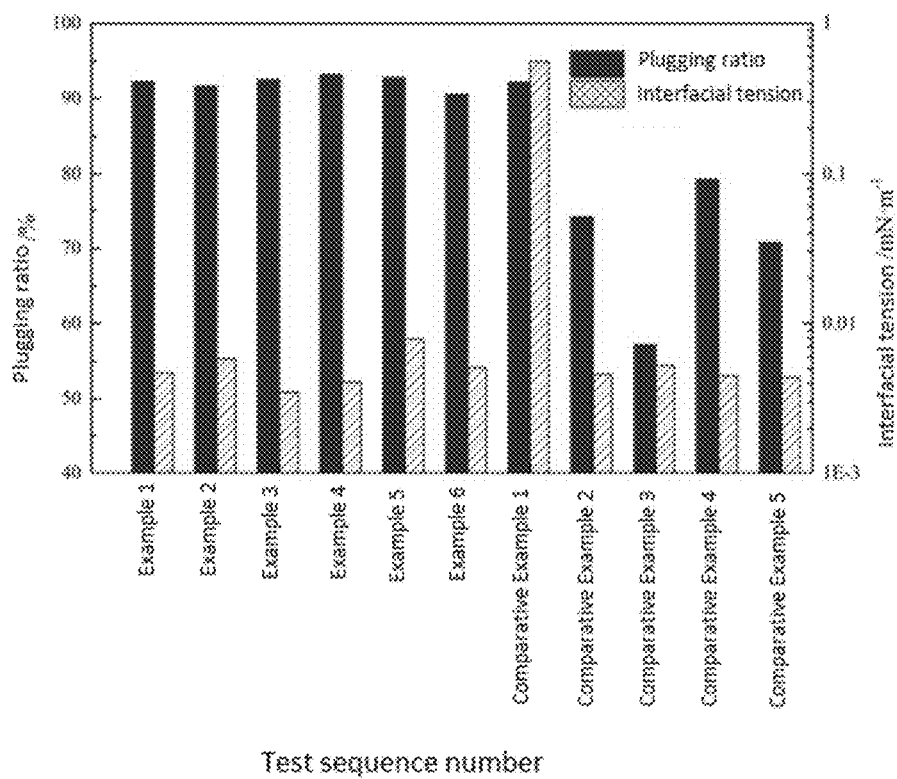
FIG. 2 is a graph illustrating test results of rock core plugging ratio and oil-water interfacial tension of the active mobility control systems in Examples 1-6 and Comparative Examples 1-5.

The test results of rock core plugging ratio and oil-water interfacial tension of the active mobility control systems in Examples 1-6 and Comparative Examples 1-5 were shown in FIG. 2. As can be seen from the test results, the active mobility control systems prepared in the present disclosure have a rock core plugging ratio of 90% or more, and can lower the oil-water interfacial tension to the order of magnitude being $10^{-3}$ mN/m, and exhibit excellent mobility control ability and interfacial activity.

Test Example 3

Figure 3:
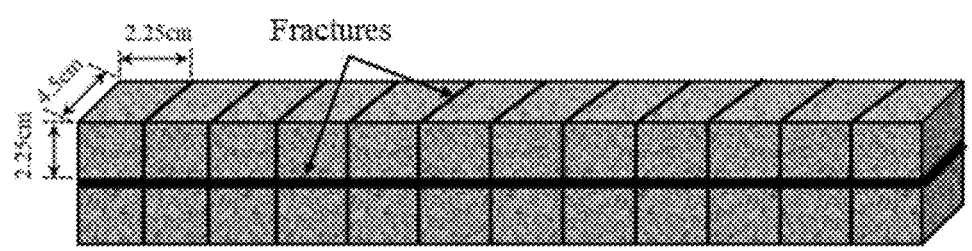
FIG. 3 shows the matrix-fracture system used in Examples 7-14 and Comparative Examples 6-9.

The capability of enhancing oil recovery with the method for control of fluid channeling between a low-permeability-tight reservoir injection well and a producing well after fracturing in Examples 7-10 and Comparative Examples 6-7 were tested by using the rock core displacement recovery ratio measurement method. The rock core displacement recovery ratio measurement experimental method was as follows: the rock core blocks (with a length of 4.5 cm, a width of 2.25 cm, a height of 2.25 cm, a permeability of 8 mD, and a porosity of 13%) were saturated with crude oil, the volume V1 of saturated oil was calculated by dividing the mass different before and after saturation with a density of the crude oil; 24 rock core blocks were combined to form a matrix-fracture system (FIG. 3), and placed in a core holder; the core holder was placed at a constant temperature of 90° C., the simulated water was injected into the matrix-fracture system at a displacement rate of 0.1 mL/min, the volume of extracted crude oil was metered, until no crude oil was recovered, the volume V2 of the finally recovered crude oil was obtained, the primary displacement recovery ratio was calculated based on the formula $E1=V2/(24\times V1)$; the experiments were performed according to Examples 7-10 and Comparative Examples 6-7 respectively, the volume V3 of the finally recovered crude oil after the secondary displacement for each group of experiments was obtained, the secondary displacement recovery ratio was calculated based on the formula $E2=V3/(24\times V1)$; the value of increased recovery ratio for each group of experiments was calculated based on the formula $I=E2-E1$.

The results of recovery ratio of Examples 7-10 and Comparative Examples 6-7 were shown in Table 1. As demonstrated by the test results, an use of the method for control of fluid channeling between a low-permeability-tight reservoir injection well and a producing well in the present disclosure can significantly enhance oil recovery of the low-permeability-tight fractured reservoirs, and further illustrate that the active mobility control system of the present disclosure is capable of self-growing in fractures of the low-permeability-tight reservoir, performs an effective and stable control on the fluid channeling of fractures, expands the spread range of the oil displacement medium; in addition, the surfactant can perform an efficient displacement of crude oil in a matrix of the low-permeability-tight reservoir, thereby improving the oil production capacity of the matrix.

TABLE 1

| Experimental examples | Recovery ratio (%) | | |
|---|---|---|---|
| | Primary displacement | Secondary displacement | Increased recovery ratio (%) |
| Example 7 | 13.2 | 33.0 | 19.8 |
| Example 8 | 13.0 | 35.4 | 22.4 |
| Example 9 | 13.3 | 31.9 | 18.6 |
| Example 10 | 13.5 | 33.7 | 20.2 |
| Comparative Example 6 | 13.6 | 22.8 | 9.2 |
| Comparative Example 7 | 13.4 | 21.9 | 8.5 |

The capability of enhancing oil recovery with the method for control a throughput fluid channeling of a low-permeability-tight reservoir producing well after fracturing in Examples 11-14 and Comparative Examples 8-9 were tested by using the rock core throughput recovery ratio measurement method. The rock core throughput recovery ratio measurement experimental method was as follows: the rock core blocks (with a length of 4.5 cm, a width of 2.25 cm, a height of 2.25 cm, a permeability of 8 mD, and a porosity of 13%) were saturated with crude oil, the volume $V1$ of saturated oil was calculated by dividing the mass different before and after saturation with a density of the crude oil; 24 rock core blocks were combined to form a matrix-fracture system (FIG. 3), and placed in a core holder; the core holder was placed at a constant temperature of 90° C., the crude oil was injected into the matrix-fracture system at a displacement rate of 0.1 mL/min until the injection pressure reached 20 MPa. The volume $V2$ of injected crude oil was metered; the matrix-fracture system was subjected to standing still and curing for 48 h; the depletion development was carried out until no crude oil was extracted, the volume $V3$ of extracted crude oil was metered, the recovery ratio during the depletion development process was calculated based on the formula $E1=V3/(24\times V1+V2)$; the experiments were performed according to Examples 11-14 and Comparative Examples 8-9 respectively, the volume $V4$ of the finally recovered crude oil after the swallowing and spitting for each group of experiments was obtained, the secondary displacement recovery ratio was calculated according to the formula $E2=V4/(24\times V1+V2)$; the value of increased recovery ratio for each group of experiments was calculated based on the formula $I=E2-E1$.

The results of recovery ratio of Examples 11-14 and Comparative Examples 8-9 were shown in Table 1. As demonstrated by the test results, an use of the method for control a throughput fluid channeling of a low-permeability-tight reservoir producing well in the present disclosure can significantly improve oil recovery of the low-permeability-tight fractured reservoirs, and further illustrate that the active mobility control system of the present disclosure is capable of self-growing in fractures of the low-permeability-tight reservoir, performs an effective and stable control on the fluid channeling of fractures, expands the spread range of the oil displacement medium; more the surfactant can perform it an efficient displacement of crude oil in a matrix of the low-permeability-tight reservoir, thereby improving the oil production capacity of the matrix.

TABLE 2

| Experimental examples | Recovery ratio (%) | | |
|---|---|---|---|
| | Depletion development | After swallowing and spitting | Increased recovery ratio (%) |
| Example 11 | 15.0 | 35.7 | 20.7 |
| Example 12 | 15.1 | 34.3 | 19.2 |
| Example 13 | 15.3 | 37.5 | 22.2 |
| Example 14 | 15.2 | 36.9 | 21.7 |
| Comparative Example 8 | 15.2 | 25.7 | 10.5 |
| Comparative Example 9 | 15.1 | 24.4 | 9.3 |

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A self-growing dispersed particle gel active mobility control system for low-permeability-tight reservoir, wherein the active mobility control system contains 100 parts by weight of a self-growing dispersed particle gel and 0.15-0.6 part by weight of a surfactant;
wherein the self-growing dispersed particle gel is prepared by shearing and grinding a nano-reinforced chromium-aldehyde double-group cross-linked integral gel;
the method of preparing the nano-reinforced chromium-aldehyde double-group cross-linked integral gel comprising:
adding a functional polymer, a phenolic resin cross-linking agent, an organic chromium cross-linking agent and a nano-reinforcer into water, mixing, and curing;
wherein the functional polymer is used in an amount of 0.4-0.8 wt %, the phenolic resin cross-linking agent is used in an amount of 0.2-0.4 wt %, the organic chromium cross-linking agent is used in an amount of 0.07-0.1 wt %, the nano-reinforcing agent is used in an amount of 0.1-0.2 wt %, and the water is used in an amount of 98.5-99.23 wt %, based on the total weight of the functional polymer, the phenolic resin cross-linking agent, the nano-reinforcing agent and the water;

wherein the functional polymer is an acrylamide/vinylsulfonate/acrylamide methylpropanesulfonate terpolymer, wherein the functional polymer has a relative molecular mass within a range of $6 \times 10^6$-$8 \times 10^6$;

wherein the phenolic resin cross-linking agent is a phenolic resin pre-polymer;

wherein the organic chromium cross-linking agent is chromium acetate;

wherein the nano-reinforcer is hydrophilic nanosilica;

wherein the surfactant is a compounded system of an alkylphenol polyoxyethylene ether type surfactant and a dialkylphenol sulfobetaine, wherein a weight ratio of the alkylphenol polyoxyethylene ether type surfactant to the dialkylphenol sulfobetaine is (2-3):1.

2. The self-growing dispersed particle gel active mobility control system of claim 1, wherein the curing conditions include: temperature within a range of 85-95° C. and a time of 1-3 h.

3. The self-growing dispersed particle gel active mobility control system of claim 1, wherein the hydrophilic nanosilica has a particle diameter within a range of 20-30 nm.

* * * * *